United States Patent Office 2,992,180
Patented July 11, 1961

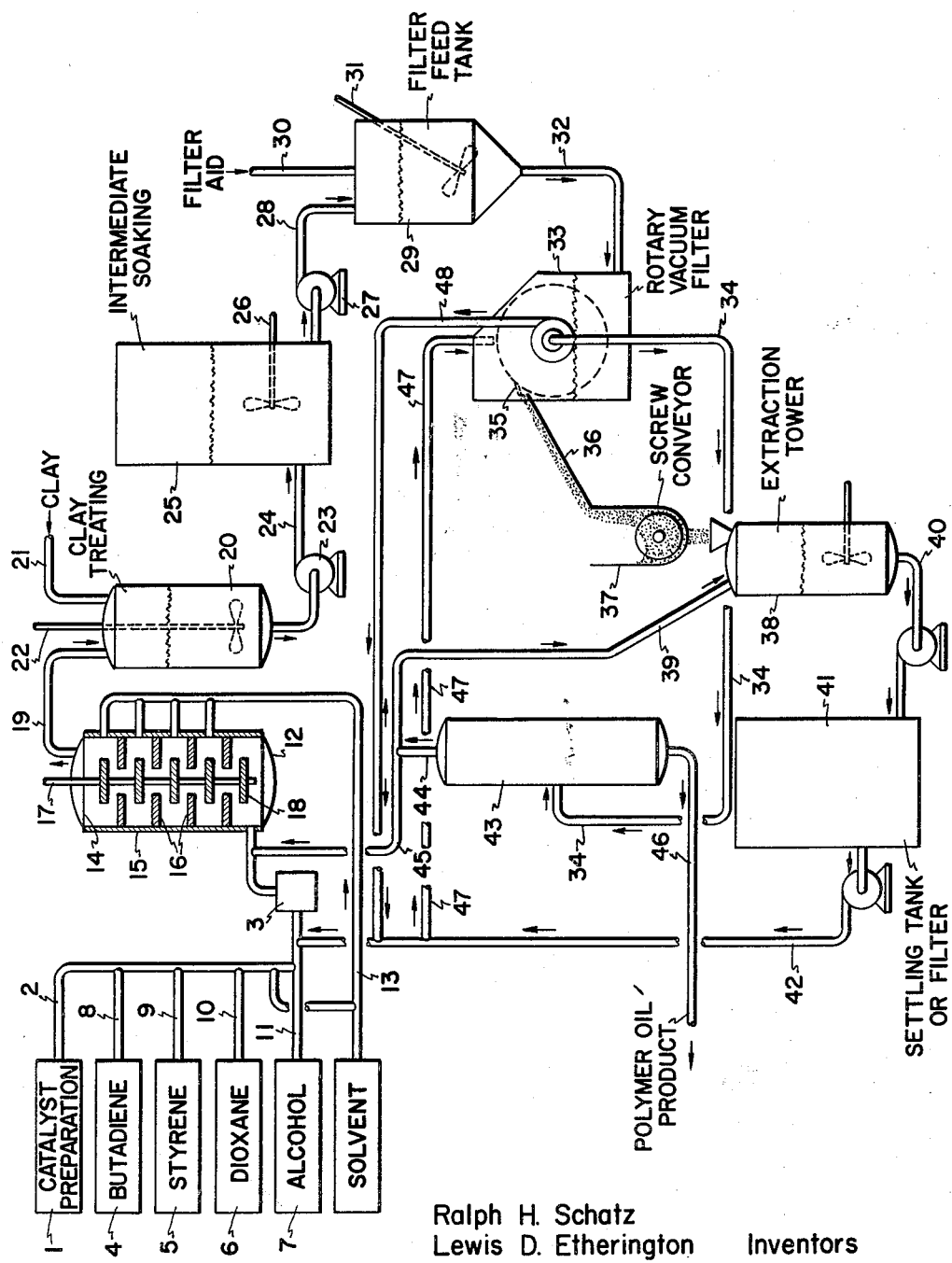

2,992,180
RECOVERING POLYMER OIL FROM SPENT CLAY
Ralph H. Schatz and Lewis D. Etherington, Westfield, and Daniel S. Maisel, Union, N.J., assignors to Esso Research and Engineering Company, a corporation of Delaware
Filed Feb. 19, 1960, Ser. No. 9,909
3 Claims. (Cl. 208—1)

This invention relates to a method for separating alkali metal catalysts from diolefin polymers or copolymers and relates more particularly to a method for reclaiming polymer or copolymer from clay used in separating the alkali metal catalyst from the polymer or copolymer.

In accordance with the teachings of U.S. Patent No. 2,862,982 to Cull et al., it is known that alkali metal catalysts, for example, sodium, can be removed from polymers of diolefins, such as butadiene, or copolymers of butadiene and styrene which have been prepared in the presence of these catalysts by contacting the polymer with clay containing 1 to 25% bound water. The clay is then separated from the polymer by filtration. Unfortunately, however, considerable amounts of polymer are adsorbed on the clay and are lost. The actual amount remaining on the clay depends upon the amount of clay used, the dryness of the filter cake and other factors, but even under the most advantageous conditions the amount lost is significant.

In accordance with this invention, it has been found that the polymer adsorbed on the clay can be recovered by extracting it with a specific hydrocarbon-containing solvent as described below.

The invention is particularly applicable to the preparation of drying oils by the polymerization of butadiene or the copolymerization of butadiene-styrene mixtures. In accordance with this process 60 to 100 parts by weight of a conjugated diolefin of 4 to 6 carbon atoms, such as butadiene-1,3, are copolymerized with 0 to 40 parts by weight of a vinyl aromatic hydrocarbon, such as styrene, or its homologs, such as methyl or ethyl styrene, in the presence of 0.5 to 10 parts by weight (based on monomers) of an alkali metal catalyst, such as sodium potassium, lithium, calcium, or rubidium. The polymerization is carried out in a reaction diluent at a temperature ranging from 25° to 105° C., preferably between 40° and 85° C. Materials used as diluents in the polymerization are inert hydrocarbons which remain liquid under the reaction conditions employed. Diluents boiling between —15° and 200° C. are therefore suitable, since a slight pressure can be imposed upon the reaction zone when the low boiling diluents are employed. The diluents are used in amounts ranging from 50 to 500, preferably 100 to 200, parts per 100 parts of monomers. It is also desirable to employ about 10–40 parts of an ether promoter per 100 parts of monomers and they may be used in addition to or instead of the hydrocarbon diluent. The use of the ethers is highly desirable since they improve the reproducibility of the process, control the molecular weight of the polymer, shorten the induction period, and are particularly effective in producing a substantially colorless product. Particularly suitable ethers are the cyclic ethers, such as dioxane-1,4, and the aliphatic ethers, such as diethyl ether. It is also desirable to include 1 to 35 parts by weight, based on the catalyst, of an aliphatic alcohol in the recipe to activate the catalyst. Suitable alcohols include methanol, isopropanol, normal pentanol, and the like.

Liquid products obtained by the above process are passed through a filter or column containing an acid clay, such as Attapulgus clay or the like, in order to remove the catalyst and metallo-organic compounds. Alternatively, the effluent from the polymerization reaction is mixed with the clay by agitation, allowing sufficient time for neutralization of the catalyst. The polymer-clay mixture is filtered, e.g., through a rotary type filter. The water content of the clay should be between 1 and 25% by weight, preferably between 5 and 15%, and should be firmly bound therein. Alternatively, acid-treated clay can be used, in which case the moisture content must not be over 1.5 to 2% in order to avoid imparting a yellow color to the final product.

Spent clay used in the above neutralization process still retains a considerable amount of polymer adsorbed thereon after filtration, totaling about 5 to 20% of the total product sent through the filter. In accordance with the present invention the clay is washed with a hydrocarbon solvent, for example, pentane, hexane, heptane, octane, benzene, toluene, or naphtha boiling 30°–200° C. The hydrocarbon extract is then recycled back to the synthesis zone. It is not necessary to obtain a low sodium concentration in the solution of polymer extracted from the clay in order to recycle this solution to the synthesis zone. Extract solutions containing more than 50 p.p.m. of sodium may thus be recycled. This will allow contact times longer than one-half hour in the extraction zone.

Referring now to the drawing, a finely divided suspension of alkali metal catalyst, for example, sodium in naphtha, from catalyst preparation vessel 1, is introduced by line 2 into mixer 3. Simultaneously butadiene from tank 4, styrene from tank 5, dioxane and naphtha make up diluent from tank 6, and alcohol from tank 7 are passed by lines 8, 9, 10, and 11, respectively, into mixer 3 and introduced into the lowermost stage of reactor 12. Naphtha solvent from line 13 may be introduced to each of the second and succeeding stages of the reactor as needed.

The reactor itself consists of a large vessel 14 surrounded by cooling jacket 15 and divided into multiple stages by means of horizontal baffles 16. A vertical shaft 17 bearing blades 18 is disposed centrally of vessel 14 as an agitator. Polymerization occurs in reactor 12 and the viscous polymer solution passes from stage to stage by overflowing between the baffles 16. The polymer solution passes from the reactor by line 19 to clay-treating vessel 20. Attapulgus clay containing 1–25 wt. percent bound water, preferably 5–15%, in an amount sufficient to neutralize the sodium and to absorb the alkali-metal organic derivatives is added to vessel 20 through line 21. The mixture is agitated by stirrer 22 and passed by pump 23 and line 24 to soaking vessel 25 where the mixture is allowed to stand for a sufficient length of time to complete the removal of the sodium and organo-sodium compounds from the polymer. Mild agitation can be given the contents of this vessel by agitator 26. After the removal of the sodium and organo sodium compounds from the oil is complete, the mixture is passed by pump 27 and line 28 to filter feed tank 29 where a filter aid, such as celite, is added to the polymer-clay mixture by line 30. The contents of tank 29 are kept from settling by means of agitator 31. Filter feed tank 29 feeds by line 32 into rotary vacuum filter 33 from which a solution of polymer free of sodium and organo-sodium compounds is removed through line 34. Spent filter cake is removed by doctor blade 35 and passes by chute 36 to screw conveyor 37 by which it is passed to extraction drum 38. In this drum the clay containing adsorbed polymer as well as sodium and organo-sodium compounds is agitated with recycle solvent and dioxane introduced through line 39. Proper conditions should be maintained in this drum so that a maximum amount of polymer and a minimum amount of sodium and organo-sodium compounds are removed from the clay. Temperatures may be between 15° and 150° C., preferably 80°–150° C., and diluent concentrations between 33 and 75%, preferably 50–60 wt. percent. After the requisite contact time in the extraction drum 38, the solvent-clay mixture is passed by line 40 to clay separating unit 41 which may conveniently be a settling tank or may be a conventional type filter. In any case, the solvent extract is separated from the clay and is removed through line 42 and recycled to the mixer 3 and thence to reactor 12.

The polymer removed through line 34 is passed to stripping tower 43 from which hydrocarbon diluent, dioxane, and any residual isopropyl alcohol is removed overhead through line 44. For the most part, this overhead stream is recycled back to reactor 12 through line 45; however, a portion of this stream is passed by line 39 to extraction drum 38 where it serves to extract adsorbed polymer oil from the spent clay as described above. Polymer oil of the desired concentration is removed from the bottom of tower 43 by line 46. It is obvious from the above description that the present invention has the advantage of recovering polymer oil from the spent clay without increasing the quantity of feed to the stripping tower 43 or increasing the concentrating equipment needed. This advantage is accomplished by recycling the filtrate from the extraction operation to the synthesis reactor. If it were sent to the stripping tower, this tower would either by overloaded or the amount of feed introduced through line 34 would be reduced. Likewise, if the filtrate from the extraction operation were recycled to the clay contacting vessel 20, the subsequent treating and stripping equipment would be subjected to an increased feed load. If the extraction solvent were a different solvent from that used in the process, then additional equipment would be needed to strip it from the polymer oil extracted.

If desired, a portion of the extract from tank 41 flowing through line 42 may be sprayed via line 47 onto the drained cake of filter 33 as a cake wash before the cake is passed to extraction tower 38. The resulting spent cake wash is then removed through line 48 and combined with the extract flowing in line 42 and thence recycled to reaction zone 12.

The following example is given to further illustrate the invention:

*Example*

A butadiene-styrene drying oil was prepared from the following charge:

| | | |
|---|---|---|
| Butadiene-1,3 | parts | 80 |
| Styrene | do | 20 |
| Dioxane | do | 20 |
| Naphtha (B.P. 150°–200° C.) | do | 100 |
| Isopropanol | do | 6.2 |
| Na (based on monomers) | do | 1.5 |
| Temperature | ° C | 50 |

The crude reaction product was filtered through Attapulgus clay containing about 20% moisture. The clay was then repuddled with a solvent consisting of 15 vol. percent dioxane and 85 vol. percent naphtha boiling 150°–200° C. under different conditions of time, temperature, and diluent concentration. The following data were obtained:

| Wt. Percent Diluent | 50 | | 66 | |
|---|---|---|---|---|
| Temperature, ° C | 80 | 150 | 80 | 150 |
| P.p.m. Na After Indicated Agitation: | | | | |
| 1 Hour | 7 | 370 | 20 | 180 |
| ½ Hour | 0 | 32 | 7 | 20 |

The above results show that low temperature, short agitation, and low diluent concentration are desirable. However, high diluent concentration and high temperature are preferred, since these give higher filter rates and higher polymer recovery. The data show that the amount of sodium and sodium compounds removed from the clay can be held below 50 p.p.m. even at high diluent concentration and high temperature provided the time of contact does not exceed ½ hour.

The nature of the present invention having been thus fully set forth and specific examples of the same given, what is claimed as new and desired to be secured by Letters Patent is:

1. A continuous process for producing a drying oil which comprises continuously charging a mixture of 60 to 100 parts of a conjugated diolefin of 4–6 carbon atoms and 0 to 40 parts of a vinyl aromatic hydrocarbon, 50 to 500 parts of a hydrocarbon diluent boiling between −15° and 200° C., 10 to 40 parts of an ether chosen from the group consisting of cyclic ethers and aliphatic ethers, 0.5 to 10 parts of finely divided alkali metal and 1 to 35% of an aliphatic alcohol, based on the weight of alkali metal, to a polymerization zone; heating the mixture to a reaction temperature between 25° and 105° C.; continuously withdrawing liquid polymerization product and passing it through a contacting zone containing an acid clay containing 1–25 wt. percent of bound water, whereby residual alkali metal is removed from the polymer; removing a major portion of the polymer from the clay in a first separation stage; recovering ether, alcohol, and diluent from the polymer; passing the clay to an extraction zone and there contacting it with at least a portion of the recovered mixture of diluent, ether, and alcohol whereby substantially the remaining portion of polymer oil occluded on the clay is removed; separating the mixture of diluent, ether, alcohol, and extracted polymer from the clay and recycling said mixture to the reaction zone.

2. A continuous process for producing a drying oil which comprises continuously charging a mixture of 60 to 100 parts of butadiene-1,3 and 0 to 40 parts of styrene, 50 to 500 parts of a naphtha boiling between 150°–200° C., 10 to 40 parts of dioxane, 0.5 to 10 parts of sodium, and 1 to 35% of isopropyl alcohol, based on the weight of sodium, to a polymerization zone; heating the mixture to a reaction temperature between 25° and 105° C.; continuously withdrawing liquid polymerization product and passing it through a contacting zone containing an acid clay containing 5–15% of bound water, whereby residual sodium is removed from the polymer; removing the polymer from the clay; recovering dioxane, isopropyl alcohol, and naphtha from the polymer; passing the clay to an extraction zone and there contacting it with at least a portion of the recovered mixture of naphtha, dioxane, and alcohol whereby the polymer oil occluded on the clay is removed; separating the mixture of naphtha, dioxane, and alcohol from the clay and recycling said mixture to the reaction zone.

3. Process according to claim 1 in which the partially polymer-free clay from the first separation stage is washed with a portion of the extract from the clay extraction zone prior to passing the clay to the extraction zone.

References Cited in the file of this patent

UNITED STATES PATENTS

| | | |
|---|---|---|
| 2,769,751 | Paull | Nov. 6, 1956 |
| 2,862,982 | Cull et al. | Dec. 2, 1958 |